(No Model.)

C. YÄKEL.
EGG TESTER.

No. 434,141. Patented Aug. 12, 1890.

Witnesses
L. C. Hills
H. Sutherland

Inventor
Carl Yäkel.
E. B. Stocking.
Attorney

UNITED STATES PATENT OFFICE.

CARL YÄKEL, OF ORWIGSBURG, ASSIGNOR TO THE ENGLE SPRING GUN COMPANY, OF HAZELTON, PENNSYLVANIA.

EGG-TESTER.

SPECIFICATION forming part of Letters Patent No. 434,141, dated August 12, 1890.

Application filed December 17, 1889. Serial No. 334,088. (No model.)

*To all whom it may concern:*

Be it known that I, CARL YÄKEL, a citizen of the United States, residing at Orwigsburg, in the county of Schuylkill, State of Pennsylvania, have invented certain new and useful Improvements in Egg-Testers, of which the following is a specification, reference being had therein to the accompanying drawings.

This invention has relation to an egg-tester, the main object of the invention being to provide a tester which will accurately test the purity of the egg, the same to be compact, light, and capable of manufacture at a minimum cost.

Other objects and advantages of the invention will appear in the following description, and the novel features thereof will be particularly pointed out in the claim.

Figure 1:
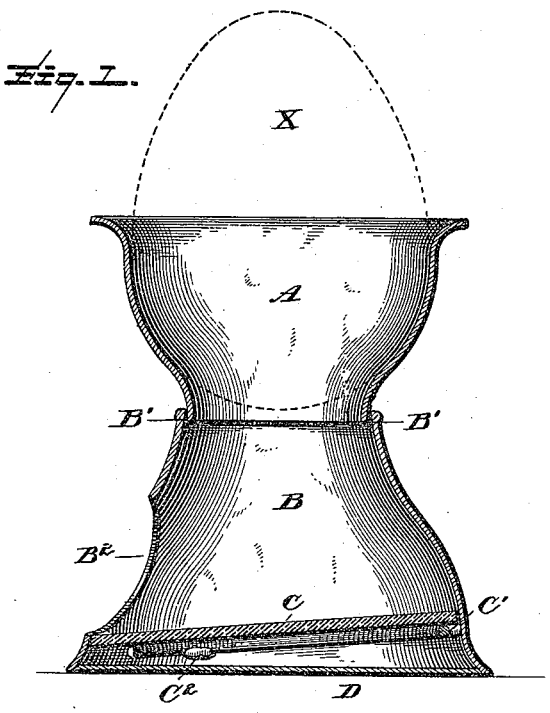
Figure 2:
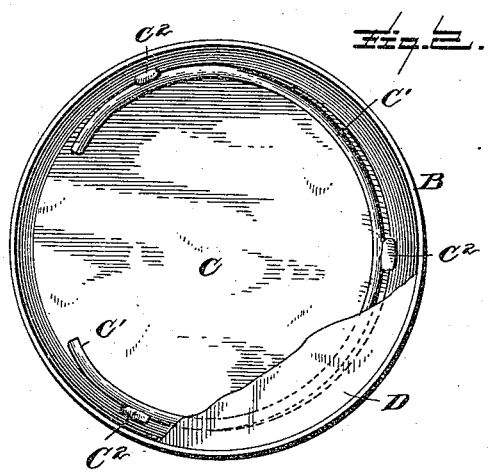

Referring to the drawings, Figure 1 is a central vertical section of an egg-tester constructed in accordance with my invention, and Fig. 2 is a bottom view of the same, a portion being removed to expose the interior construction.

Like letters of reference refer to like parts in both the figures of the drawings.

The tester is preferably constructed of thin metal, and is composed of two semi-spheroidal sections A and B. The section A is open, and is of a size to receive an ordinary egg, as X. (Shown by dotted lines.) One end of the section A is made small, and is adapted for insertion in the section B, being held therein by an annular joint of solder B', this form of joint serving to surely exclude the entrance of light. The section B is provided with a circular sight-opening $B^2$ of such a size that a full view may be obtained of the exposing-mirror C. The mirror C is arranged at an incline, and is securely held from being pressed downwardly by resting on the rib C', of wire, which is secured therein by solder $C^2$ at suitable points. The mirror C is prevented from being pressed upwardly by its fitting snugly against the interior sloping walls of the section B. The section B is provided with a suitable bottom D, which forms a suitable base for the tester and protects the mirror from injury, also adding a finished appearance to the tester.

To test the freshness of an egg, it is placed within the section A, with the small end up, and held in the sun or near an artificial light, the result of the test being shown on the exposing-mirror C.

By the construction above described it will be seen that I produce a compact, finished, serviceable, and cheap article, the most fragile portion of which is cheaply held in place and thoroughly protected from injury.

What I claim is—

An egg-tester consisting of the semi-spheroidal sections A and B, secured together by an annular joint of solder B', the section B having the sight-opening $B^2$, mirror C, wire rib C', secured at suitable points by solder $C^2$, and the bottom D, substantially as specified.

In testimony whereof I affix my signature in presence of two witnesses.

CARL YÄKEL.

Witnesses:
S. R. KEPNER,
H. W. SHAPPELL.